(12) United States Patent
Namkung et al.

(10) Patent No.: US 9,718,263 B2
(45) Date of Patent: Aug. 1, 2017

(54) MANUFACTURING METHOD OF FLEXIBLE DISPLAY DEVICE

(71) Applicant: SAMSUNG DISPLAY CO., LTD., Yongin, Gyeonggi-Do (KR)

(72) Inventors: Jun Namkung, Asan-si (KR); Soon Ryong Park, Sejong-si (KR); Chul Woo Jeong, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 305 days.

(21) Appl. No.: 14/669,403

(22) Filed: Mar. 26, 2015

(65) Prior Publication Data

US 2016/0101610 A1    Apr. 14, 2016

(30) Foreign Application Priority Data

Oct. 14, 2014   (KR) ........................ 10-2014-0138485

(51) Int. Cl.
*B29C 61/06*      (2006.01)
*B32B 38/18*      (2006.01)
*B32B 37/12*      (2006.01)
*B29C 53/04*      (2006.01)
*G02F 1/1333*     (2006.01)

(52) U.S. Cl.
CPC ............ *B32B 37/12* (2013.01); *B29C 61/065* (2013.01); *B32B 38/1866* (2013.01); *B29C 53/04* (2013.01); *B32B 2333/12* (2013.01); *B32B 2367/00* (2013.01); *B32B 2369/00* (2013.01); *B32B 2457/20* (2013.01); *G02F 1/133305* (2013.01)

(58) Field of Classification Search
None
See application file for complete search history.

(56) References Cited

U.S. PATENT DOCUMENTS

2014/0063434 A1*  3/2014  Zhao .................. B23B 27/00
                                                    349/158
2015/0316803 A1*  11/2015  Zhang ............... H01L 27/1259
                                                    257/72

FOREIGN PATENT DOCUMENTS

JP    05-269765 A       10/1993
KR    10-2011-0088979 A  8/2011
KR    10-2014-0001579 A  1/2014
KR    10-2015-0007632 A  1/2015

\* cited by examiner

*Primary Examiner* — Barbara J Musser
(74) *Attorney, Agent, or Firm* — Lee & Morse, P.C.

(57) ABSTRACT

Provided is a manufacturing method of a flexible display device, including locally deforming a transparent window; attaching a contractive film to a flexible display panel including a display area implementing an image; bending the flexible display panel by applying energy to the contractive film; and attaching the flexible display panel to the transparent window.

16 Claims, 7 Drawing Sheets

MANUFACTURING METHOD OF FLEXIBLE DISPLAY DEVICE

CROSS-REFERENCE TO RELATED APPLICATION

Korean Patent Application No. 10-2014-0138485, filed on Oct. 14, 2014, in the Korean Intellectual Property Office, and entitled: "Manufacturing Method of Flexible Display Device," is incorporated by reference herein in its entirety.

BACKGROUND

1. Field

The described technology relates to a manufacturing method of a display device.

2. Description of the Related Art

Flat panel displays include, for example, liquid crystal display (LCDs), plasma display panel (PDPs), organic light emitting diode (OLED) devices, field effect display (FEDs), and electrophoretic display devices.

SUMMARY

Embodiments may be realized by providing a manufacturing method of a flexible display device, including locally deforming a transparent window; attaching a contractive film to a flexible display panel including a display area implementing an image; bending the flexible display panel by applying energy to the contractive film; and attaching the flexible display panel to the transparent window.

Attaching the contractive film to the flexible display panel may include attaching the contractive film to only a bending region of the flexible display panel.

Attaching the contractive film to the flexible display panel may include attaching the contractive film to a bottom of the flexible display panel by using a pressure sensitive adhesive (PSA).

The contractive film may include a polyolefin resin.

The contractive film may include a polyolefin resin and a polymer-based material.

The polymer-based material may include polyethyleneterephtalate (PET), polycarbonate (PC), polyethersulfone (PES), polyethylenenaphthalate (PEN), fiber reinforced plastic (FRP), polyacrylate (PA), polyethylene (PE), polyolefin (PO), polysulfone (PSF), or triacetylcellulose (TAC).

Locally deforming the transparent window may include locally bending opposite edges of the transparent window.

Bending the flexible display panel may include locally bending opposite edges of the flexible display panel.

Bending the flexible display panel may include ultraviolet (UV) light irradiation, thermal energy application, or pressure energy application.

Attaching the flexible display panel to the transparent window may include attaching the flexible display panel and the transparent window to each other by inter-pressure.

Attaching the flexible display panel to the transparent window may include attaching the flexible display panel and the transparent window to each other by an optically clear adhesive (OCA) film.

The manufacturing method may further include attaching a polyethyleneterephtalate (PET) film onto one surface of the flexible display panel before attaching the contractive film to the flexible display panel.

The PET film may have a groove corresponding to a region where the flexible display panel is bent.

The contractive film may be attached onto the PET film.

The contractive film may fill the groove of the PET film.

The manufacturing method may further include attaching the PET film onto the contractive film after attaching the contractive film to the flexible display panel.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
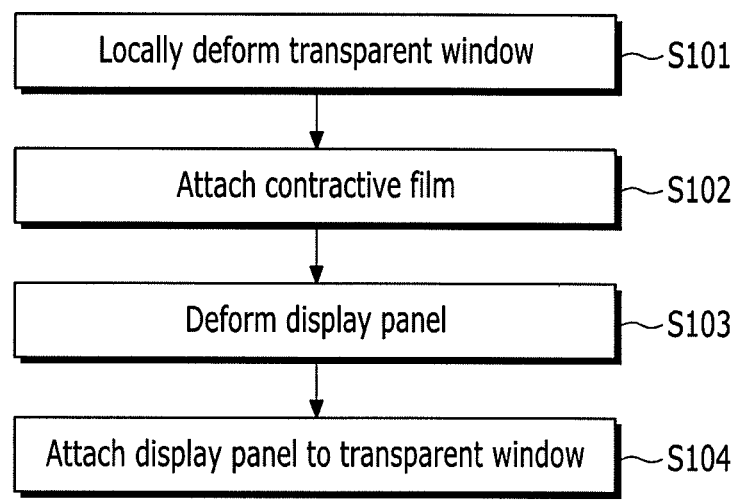
FIG. 1 illustrates a flowchart of a manufacturing method of a flexible display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

It is noted that the drawings are schematic and not illustrated according to a scale. Relative dimensions and ratios of portions in the drawings are exaggerated or reduced for clarity and convenience in the drawings, and any dimension is just exemplified and not limited. In addition, for like structures, elements, or components illustrated in two or more drawings, like reference numerals are used in order to represent similar features. It will be understood that when an element such as a layer, film, region, or substrate is referred to as being "on" another element, it can be directly on the other element or intervening elements may also be present.

Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

The exemplary embodiment represents an exemplary embodiment in detail. As a result, numerous variations of the drawings are expected. Therefore, the exemplary embodiment is not limited to a specific form of the illustrated region, and for example, includes a modification of a shape by manufacturing.

Hereinafter, a manufacturing method of a flexible display device according to an exemplary embodiment will be described in detail with reference to FIGS. 1 and 2A to 2D.

FIG. 1 illustrates a flowchart of a manufacturing method of a flexible display device according to an exemplary embodiment, and FIGS. 2A to 2D illustrate diagrams of the flexible display device according to the exemplary embodiment in a manufacturing order.

Referring to FIGS. 1 and 2A to 2D, a manufacturing method of a flexible display device may include deforming a window (S101), attaching a contractive film (S102), deforming a display panel (S103), and attaching the display panel (S104).

Figure 2A:
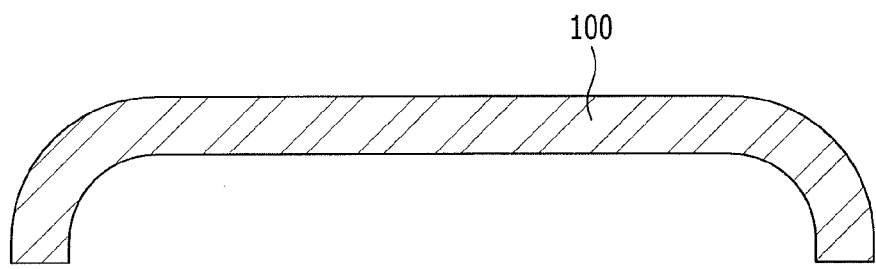
FIGS. 2A to 2D illustrate diagrams of the flexible display device according to the exemplary embodiment in a manufacturing order.

First, a transparent window 100 may be locally deformed (S101). As illustrated in FIG. 2A, both, e.g., opposite, edges of the transparent window 100 may be locally bent. In a subsequent operation, a convex-shaped flexible display panel, e.g., a top of the convex-shaped flexible display panel, may be attached to the window 100, e.g., to a bottom of the window 100, and both, e.g., opposite, edges of the transparent window 100 may be curved in a convex shape.

The transparent window 100 may be provided to cover a side where an image is implemented and may be formed of a glass material and a transparent thermoplastic resin such as polymethyl methacrylate (PMMA) and polycarbonate (PC). The transparent window 100 may be bent to have a position and a curvature designed by, for example, molding. The transparent window 100 may serve to protect a flexible display panel 210 from external impact or scratch and may serve as a support means for maintaining a curved shape of the flexible display panel 210.

Figure 2B:
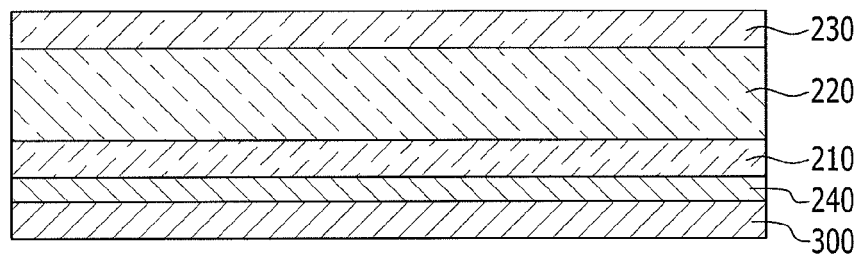

Thereafter, as illustrated in FIG. 2B, a contractive film 300 may be attached to a side of the flexible display panel 210 opposite to a side to which the transparent window 100 of the flexible display panel 210 may be attached (S102).

The contractive film 300 may be attached to the entire surface of the bottom of a thin film transistor layer of the flexible display panel 210. Although not illustrated, the contractive film 300 may be attached to only a bending region of the flexible display panel 210.

The contractive film 300 may be attached to the flexible display panel 210 by a pressure sensitive adhesive (PSA) 240. The contractive film 300 may be attached to the flexible display panel 210 by using various known adhesives in addition to the pressure sensitive adhesive. A polarization film 220 and a touch screen panel (TSP) 230 may be sequentially attached to the top of the flexible display panel 210.

The flexible display panel 210 may be an organic light emitting display panel. For example, the organic light emitting display panel may include a driving circuit unit and an organic light emitting element formed on a flexible substrate. The flexible substrate may be formed of, for example, a flexible plastic material. In an embodiment, the flexible substrate may be formed as a metallic substrate made of, for example, stainless steel and other various flexible materials may be used. The driving circuit unit may include a thin film transistor and may drive the organic light emitting element. The organic light emitting element may be connected with, e.g., to, the driving circuit unit to emit light according to a driving signal received from the driving circuit unit and display an image. The top of the organic light emitting element may be covered by a thin film encapsulation layer. The thin film encapsulation layer may have a structure in which one or more organic layers and one or more inorganic layers are alternately laminated, and the organic layers or the inorganic layers may be in plural.

Figure 2C:
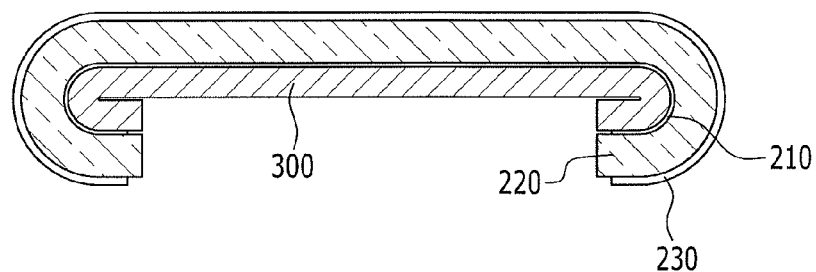

Thereafter, as illustrated in FIG. 2C, both, e.g., opposite, edges of the flexible display panel 210 may be locally bent by contract force of the contractive film 300 by applying energy to the contractive film 300 (S103). The bent portion of the flexible display panel 210 may be formed to substantially correspond to the bent portion of the transparent window 100 described above. As a method of applying energy to the contractive film 300, ultraviolet (UV) light irradiation, thermal energy application, or pressure energy application may be used.

Figure 2D:
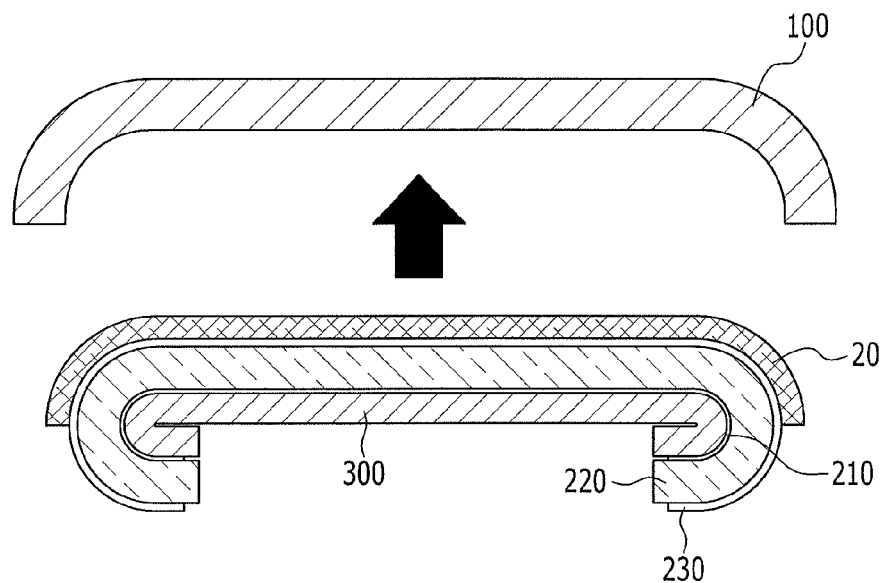

Thereafter, as illustrated in FIG. 2D, the flexible display panel 210 and the transparent window 100 may be attached to each other (S104). The flexible display panel 210 and the transparent window 100 may be attached to each other by an optically clear adhesive (OCA) film 20 through inter-pressure.

In attaching the display panel (S104), the flexible display panel 210 pre-bent to correspond to the bending shape of the transparent window 100 may be pressed, and it may be possible to prevent bubbles from becoming trapped at the edges, which may occur when pressing an existing planar display panel to a bent transparent window.

A curvature radius of the bending region formed on the flexible display panel 210 may be formed to be larger than a curvature radius of the bending region formed on the transparent window 100, and the bending portions, e.g., the bending region on the flexible display panel 210 and the bending region formed on the transparent window 100, may be naturally attached to each other by pressing toward the transparent window 100 from the lower portion of the flexible display panel 210, e.g., pressing the flexible display panel 210 toward the transparent window 100. In attaching the display panel, the pre-bent flexible display panel 210 may be attached to the transparent window 100 by applying pressure while the flexible display panel 210 is pushed up toward the transparent window 100 from the lower portion by using a support such as a polymer form.

Figure 3:
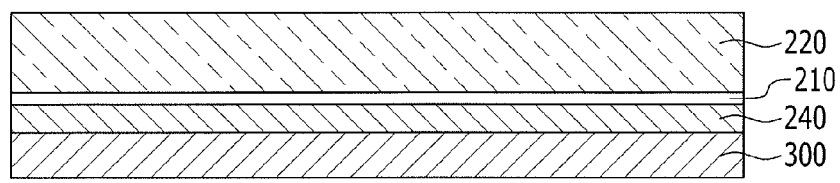
FIG. 3 illustrates a diagram of a laminating structure of the flexible display device according to the exemplary embodiment.

FIG. 3 illustrates a diagram of a laminating structure of the flexible display device according to the exemplary embodiment.

Referring to FIG. 3, the contractive film 300 may be attached to the bottom of the flexible display panel 210 by the PSA 240. The contractive film 300 may be attached to the entire surface of the bottom of the flexible display panel 210. A polarization film 220 may be provided on the flexible display panel 210. As illustrated in FIGS. 2B to 2D, a touch screen panel 230 may be provided on the polarization film 220.

The contractive film 300 may be formed of a polyolefin resin. The polyolefin resin may be a polymer compound generated, e.g., formed, by polymerization of an olefin (a chain hydrocarbon compound having one a double bond). Polyolefin resins may be among the lightest plastics and may have excellent transparency. Polyethylene and polypropylene are representative examples of a polyolefin.

Figure 4:
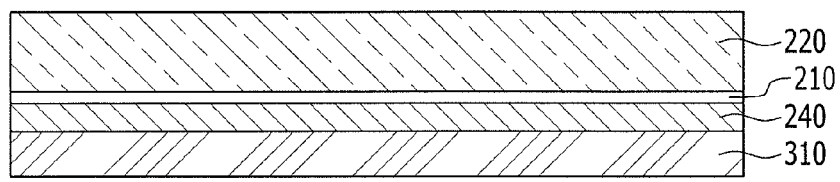
FIG. 4 illustrates a diagram of a laminating structure of the flexible display device according to a modified example of the exemplary embodiment illustrated in FIG. 3.

FIG. 4 illustrates a diagram of a laminating structure of the flexible display device according to a modified example of the exemplary embodiment illustrated in FIG. 3. As illustrated in FIG. 4, a contractive film 310 may include a combination of a polyolefin resin and a polymer-based material. The polymer-based material may be formed of polyethyleneterephtalate (PET), Polycarbonate (PC), polyethersulfone (PES), polyethylenenaphthalate (PEN), fiber reinforced plastic (FRP), polyacrylate (PA), polyethylene (PE), polyolefin (PO), polysulfone (PSF), or triacetylcellulose (TAC). In FIG. 4, the laminated structure is the same as the laminated structure of FIG. 3 except that the material of the contractive film 310 may include a combination of a polyolefin resin and a polymer-based material.

Figure 5:
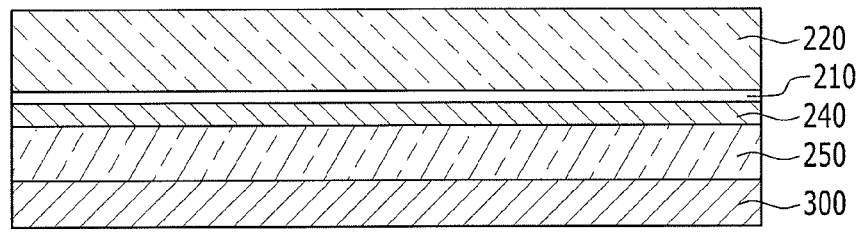
FIG. 5 illustrates a diagram of a laminating structure of a flexible display device according to another exemplary embodiment.

FIG. 5 illustrates a diagram of a laminating structure of a flexible display device according to another exemplary embodiment. Referring to FIG. 5, a polyethyleneterephtalate (PET) film 250 may be attached to one surface of the flexible display panel 210 by using the pressure sensitive adhesive 240. For example, in the manufacturing method of the flexible display device described above, before attaching the contractive film (S102), the PET film 250 may be attached to one surface of the flexible display panel 210, and the PET film 250 may be further provided between the flexible display panel 210 and the contractive film 300.

Figure 7:
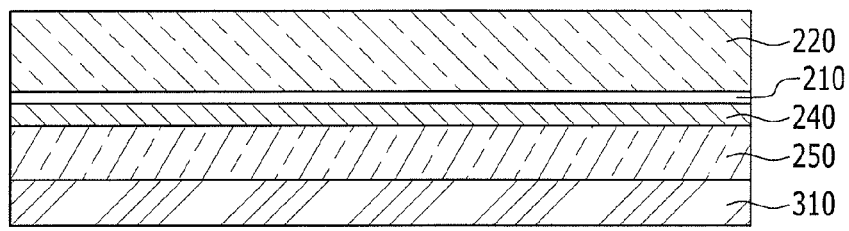
FIG. 7 illustrates a diagram of a laminating structure of the flexible display device according to a modified example of another exemplary embodiment illustrated in FIG. 5.

The contractive film 300 may be formed of a material formed of only a polyolefin resin on the entire surface of the PET film 250 as illustrated in FIG. 5 and the contractive film 310 may include a combination of a polyolefin resin and a polymer-based material as illustrated in FIG. 7.

Figure 6:
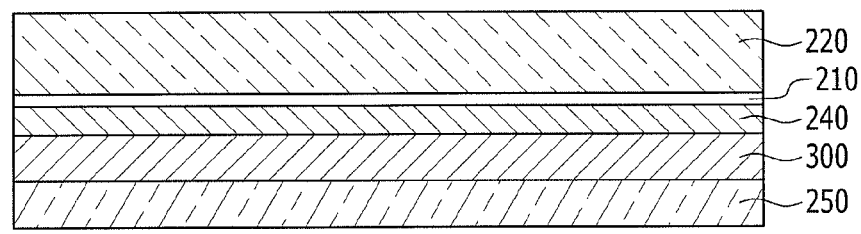
FIG. 6 illustrates a diagram of a laminating structure of a flexible display device according to another exemplary embodiment.

FIG. 6 illustrates a diagram of a laminating structure of a flexible display device according to another exemplary embodiment. Referring to FIG. 6, the contractive film 300 may be attached to one surface of the flexible display panel 310 by using the pressure sensitive adhesive 240 and the PET film 250 may be further attached to the contractive film 300. For example, in the exemplary embodiment, in the manufacturing method of the flexible display device, after attaching the contractive film (S102), the PET film may be attached to the contractive film, and the PET film 250 may be attached onto the bottom of the contractive film 300. The contractive film 300 may be formed of only a polyolefin resin or a combination of a polyolefin resin and a polymer-based material.

Figure 8:
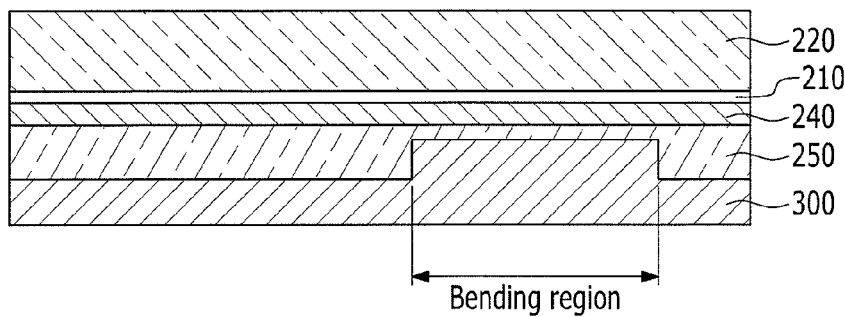
FIG. 8 illustrates a diagram of a laminating structure of a flexible display device according to another exemplary embodiment.

Referring to FIG. 8, the PET film 250 may have a groove corresponding to the bending region where the flexible display panel 210 is bent. The groove formed on the PET film 250 may have a predetermined width in a horizontal direction to the surface of the flexible display panel 210 and a predetermined depth in a vertical direction to the surface of the flexible display panel 210. The groove formed on the PET film 250 may not penetrate through the PET film 250, and the thickness of the PET film 250 at the portion with the groove is relatively smaller than that of the PET film 250 at the portion without the groove, and bending may be easily achieved. A shape of the groove formed on the PET film 250, as illustrated, for example, in FIG. 8, may be variously modified.

The PET film 250 with the groove may be attached to one surface of the flexible display panel 210 by using the pressure sensitive adhesive 240 and the contractive film 300 may be attached to the PET film 250. The contractive film 300 may be filled in the groove formed on the PET film 250.

The contractive film 300 may be formed of only a polyolefin resin or a combination of a polyolefin resin and a polymer-based material.

Figure 9:
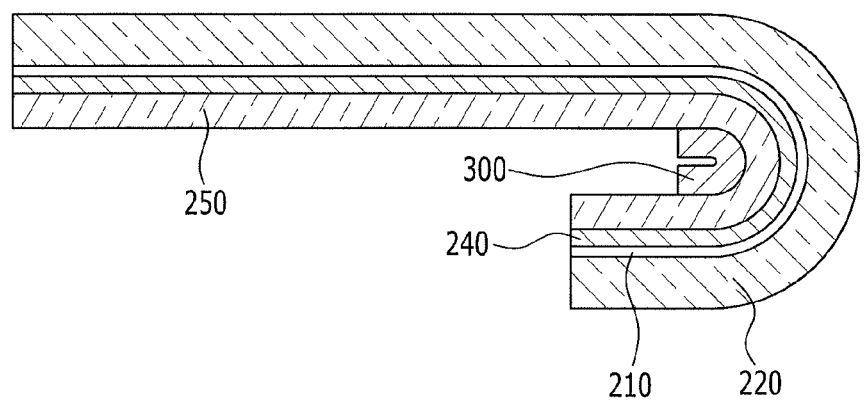
FIG. 9 illustrates a diagram of a laminating structure of a flexible display device according to another exemplary embodiment.

FIG. 9 illustrates a diagram of a laminating structure of a flexible display device according to another exemplary embodiment. Referring to FIG. 9, the contractive film 300 may be attached to only a bending region of the flexible display panel 210. The PET film 250 may be attached to one surface of the flexible display panel 210 by using the pressure sensitive adhesive 240, and the contractive film 300 may be attached to only the bending region on the PET film 250.

Figure 10:
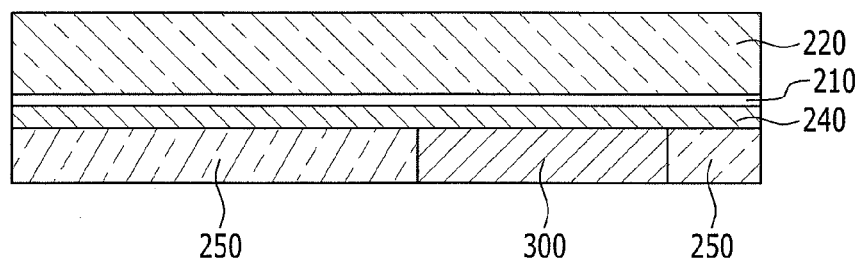
FIG. 10 illustrates a diagram of a laminating structure of a flexible display device according to another exemplary embodiment.

FIG. 10 illustrates a diagram of a laminating structure of a flexible display device according to another exemplary embodiment. As illustrated in FIG. 10, the PET film 250 and the contractive film 300 may be attached on one surface of the flexible display panel 210 with the same phase, and the contractive film 300 may be attached to only the bending region of the flexible display panel 210.

With respect to the flexible display device illustrated in FIGS. 9 and 10, the contractive film 300 may be formed of only a polyolefin resin or a combination of a polyolefin resin and a polymer-based material.

By way of summation and review, in a display device, layers such as a display panel including a thin film transistor and an emission layer, a polarization film on the display panel, and a touch screen panel (TSP) may be laminated. At the outermost portion of the display device, the layers such as the display panel, the polarization film, and the touch screen panel may be encapsulated by using a transparent window, and moisture or oxygen may be prevented from penetrating from the outside.

For example, in the case of a flexible display device, in order to implement a bending shape, a lamination method may be used. The lamination method may include laminating the display panel on the transparent window implemented in a predetermined shape by applying pressure while pushing up the display panel from below by using a support such as a polymer form. In the case of laminating a flat display panel on a transparent window while pushing up the display panel, a phenomenon in which bubbles may be trapped at a curved portion of a pre-deformed portion of the transparent window may occur. A method of laminating the display panel by pushing up the display panel after forming a vacuum by introducing a vacuum chamber may be applied, but equipment costs for implementing the vacuum may be expensive and a tact time may be increased.

Provided is a manufacturing method of a display device that may include laminating a flexible display panel on a transparent window by pre-bending the display panel. In an embodiment, the manufacturing method of a flexible display device may use a contractive film.

According to the manufacturing method of the flexible display device according to exemplary embodiments, it may be possible to prevent a phenomenon in which bubbles are trapped in a bending region between a transparent window and a display panel, to facilitate a manufacturing process, and to shorten a tact time.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A manufacturing method of a flexible display device, comprising:
   locally deforming a transparent window;
   attaching a contractive film to a flexible display panel including a display area implementing an image;
   bending the flexible display panel by applying energy to the contractive film; and
   attaching the flexible display panel to the transparent window.

2. The manufacturing method as claimed in claim 1, wherein attaching the contractive film to the flexible display panel includes attaching the contractive film to only a bending region of the flexible display panel.

3. The manufacturing method as claimed in claim 1, wherein attaching the contractive film to the flexible display panel includes attaching the contractive film to a bottom of the flexible display panel by using a pressure sensitive adhesive (PSA).

4. The manufacturing method as claimed in claim 1, wherein the contractive film includes a polyolefin resin.

5. The manufacturing method as claimed in claim 1, wherein the contractive film includes a polyolefin resin and a polymer-based material.

6. The manufacturing method as claimed in claim 5, wherein the polymer-based material includes polyethylene terephtalate (PET), polycarbonate (PC), polyethersulfone (PES), polyethylene naphthalate (PEN), fiber reinforced plastic (FRP), polyacrylate (PA), polyethylene (PE), polyolefin (PO), polysulfone (PSF), or triacetylcellulose (TAC).

7. The manufacturing method as claimed in claim 1, wherein locally deforming the transparent window includes locally bending opposite edges of the transparent window.

8. The manufacturing method as claimed in claim 1, wherein bending the flexible display panel includes locally bending opposite edges of the flexible display panel.

9. The manufacturing method as claimed in claim 1, wherein bending the flexible display panel includes ultraviolet (UV) light irradiation, thermal energy application, or pressure energy application.

10. The manufacturing method as claimed in claim 1, wherein attaching the flexible display panel to the transparent window includes attaching the flexible display panel and the transparent window to each other by inter-pressure.

11. The manufacturing method as claimed in claim 1, wherein attaching the flexible display panel to the transparent window includes attaching the flexible display panel and the transparent window to each other by an optically clear adhesive (OCA) film.

12. The manufacturing method as claimed in claim 1, further comprising attaching a polyethyleneterephtalate (PET) film onto one surface of the flexible display panel before attaching the contractive film to the flexible display panel.

13. The manufacturing method as claimed in claim 12, wherein the PET film has a groove corresponding to a region where the flexible display panel is bent.

14. The manufacturing method as claimed in claim 12, wherein the contractive film is attached onto the PET film.

15. The manufacturing method as claimed in claim 13, wherein the contractive film fills the groove of the PET film.

16. The manufacturing method as claimed in claim 12, further comprising attaching the PET film onto the contractive film after attaching the contractive film to the flexible display panel.

* * * * *